United States Patent Office

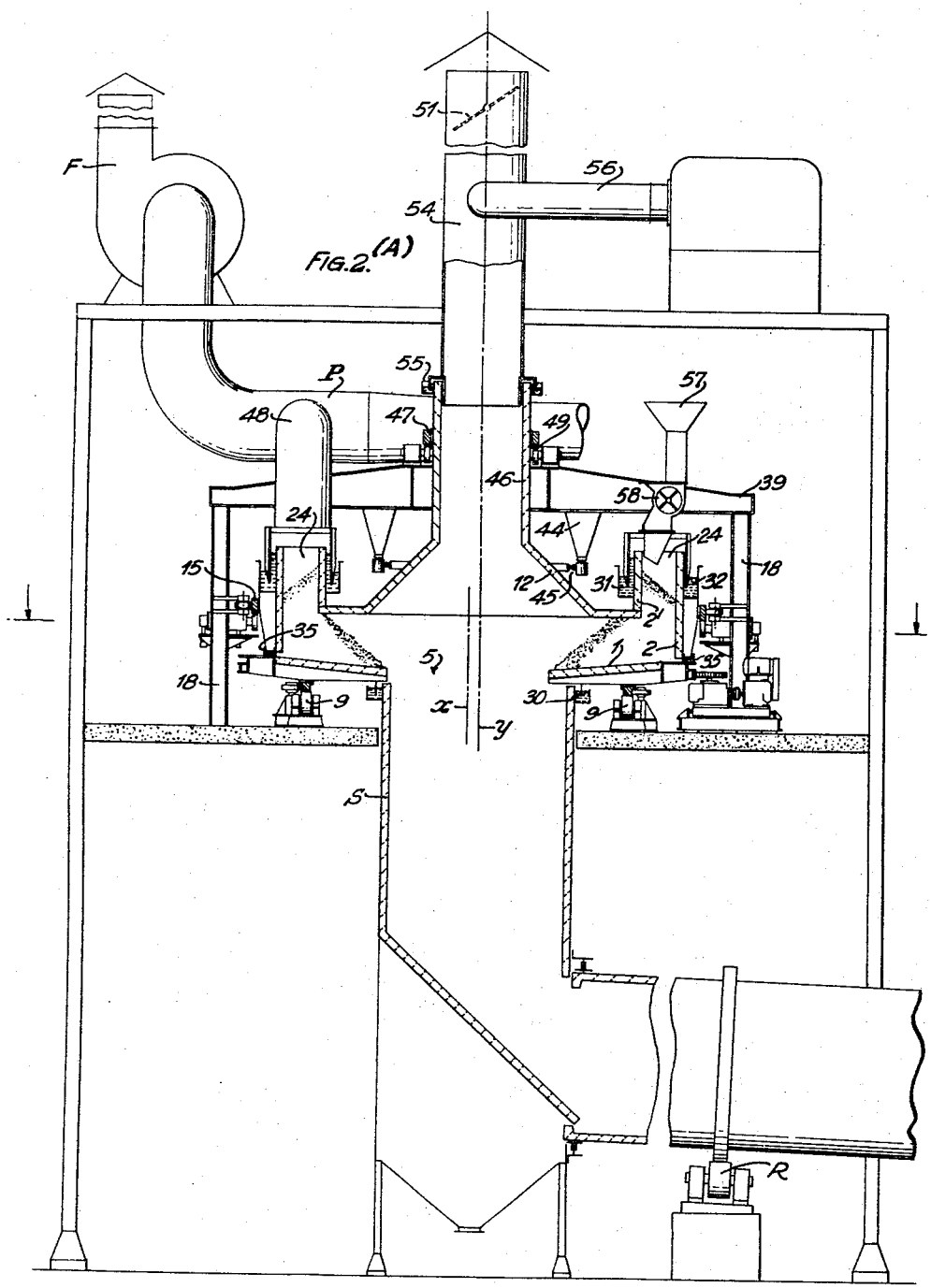

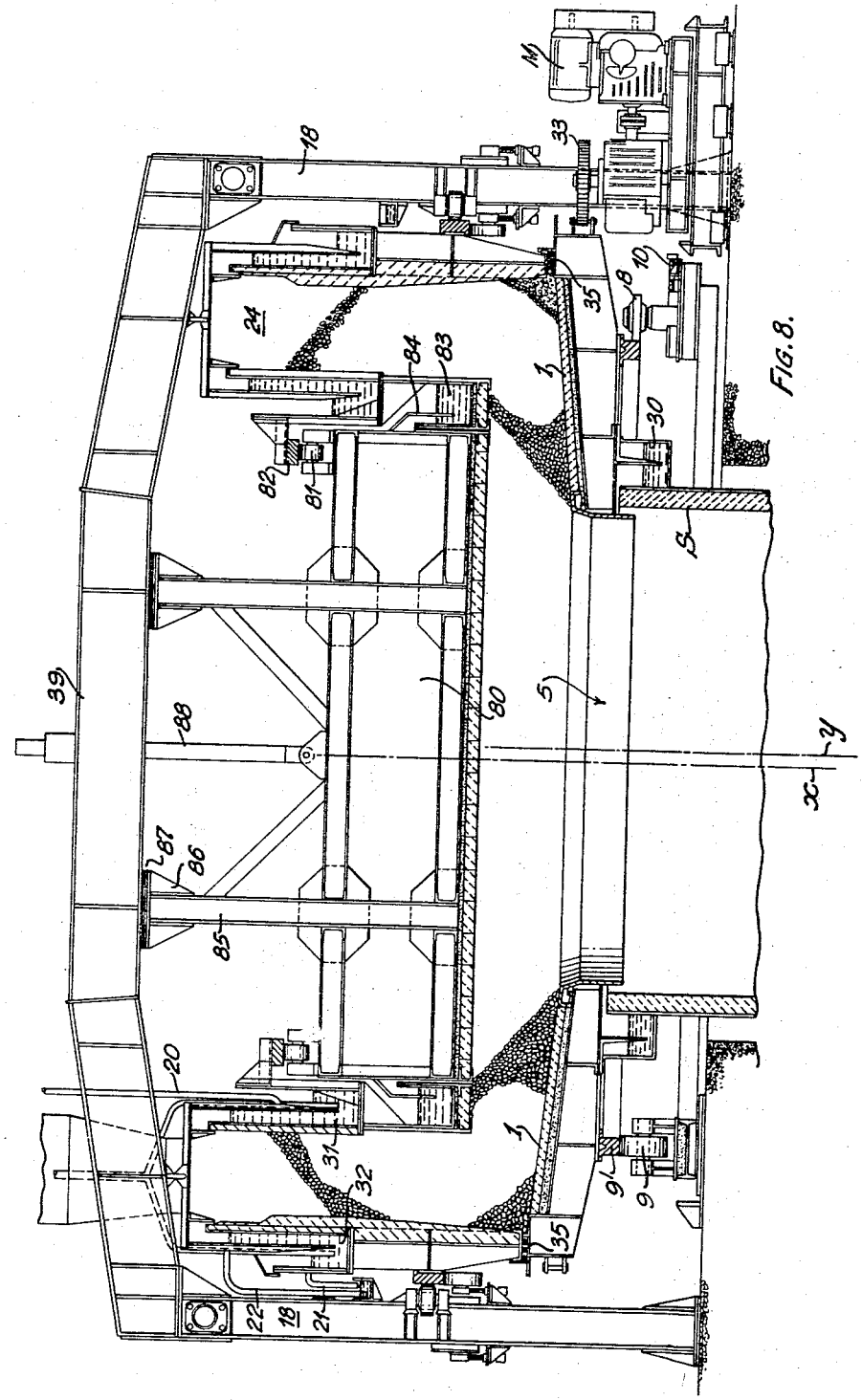

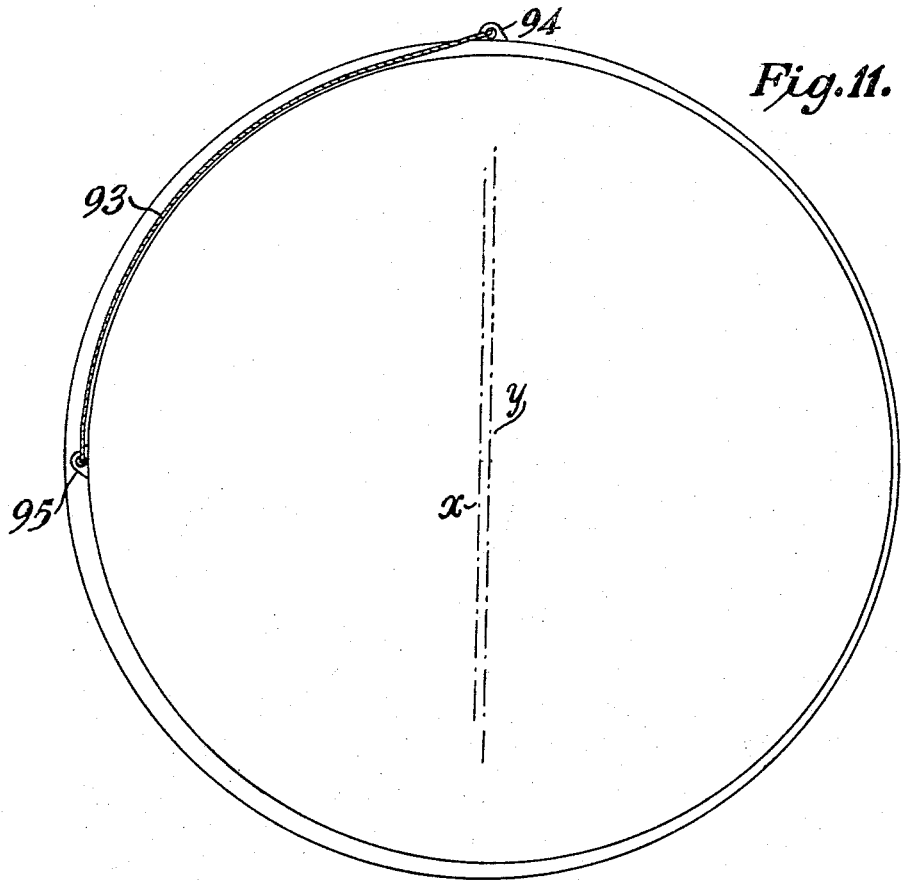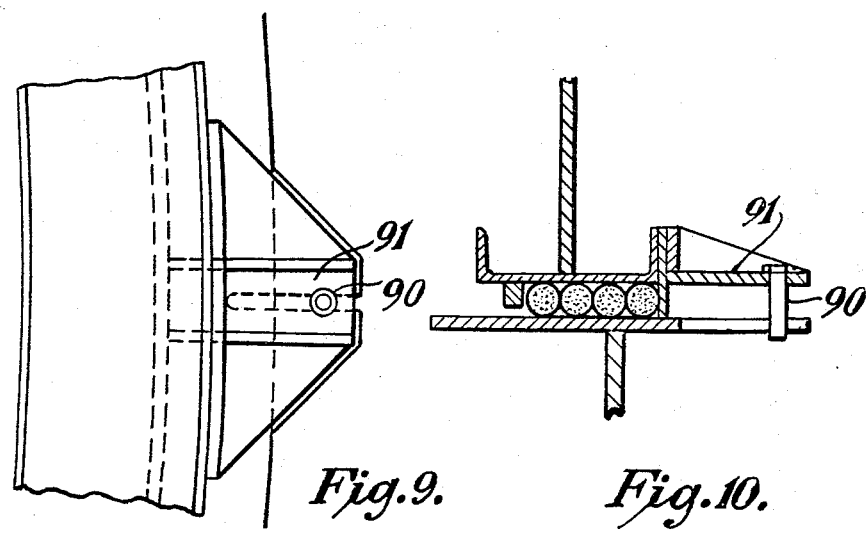

3,331,595
Patented July 18, 1967

3,331,595
APPARATUS FOR EFFECTING CONTACT
BETWEEN SOLIDS AND GASES
Philip Henry Nelson, Limpsfield, and Geoffrey George
John Davis, London, England, assignors to The Associated Portland Cement Manufacturers Limited, London,
England, a corporation of the United Kingdom
Filed Dec. 7, 1966, Ser. No. 599,788
Claims priority, application Great Britain, May 6, 1964,
18,834/64
23 Claims. (Cl. 263—28)

ABSTRACT OF THE DISCLOSURE

Apparatus for the preliminary heat treatment of cement raw materials, but also utilisable for any process or treatment involving the contact of solids and gases comprising an annular chamber surmounting a hearth, the chamber and hearth being arranged for rotation about offset axes to effect controlled continuous discharge of material from the chamber through a central opening in the hearth. A stationary cover is provided for the chamber and a roof structure, the upper surface of which is exposed to the atmosphere, is provided to span the central space defined by the chamber above the centre of the hearth. Gases to treat material in the chamber may either be introduced via the central opening in the hearth or an opening in the roof structure. Heating gases may also be generated in the space enclosed by the roof structure.

---

Figure 1:
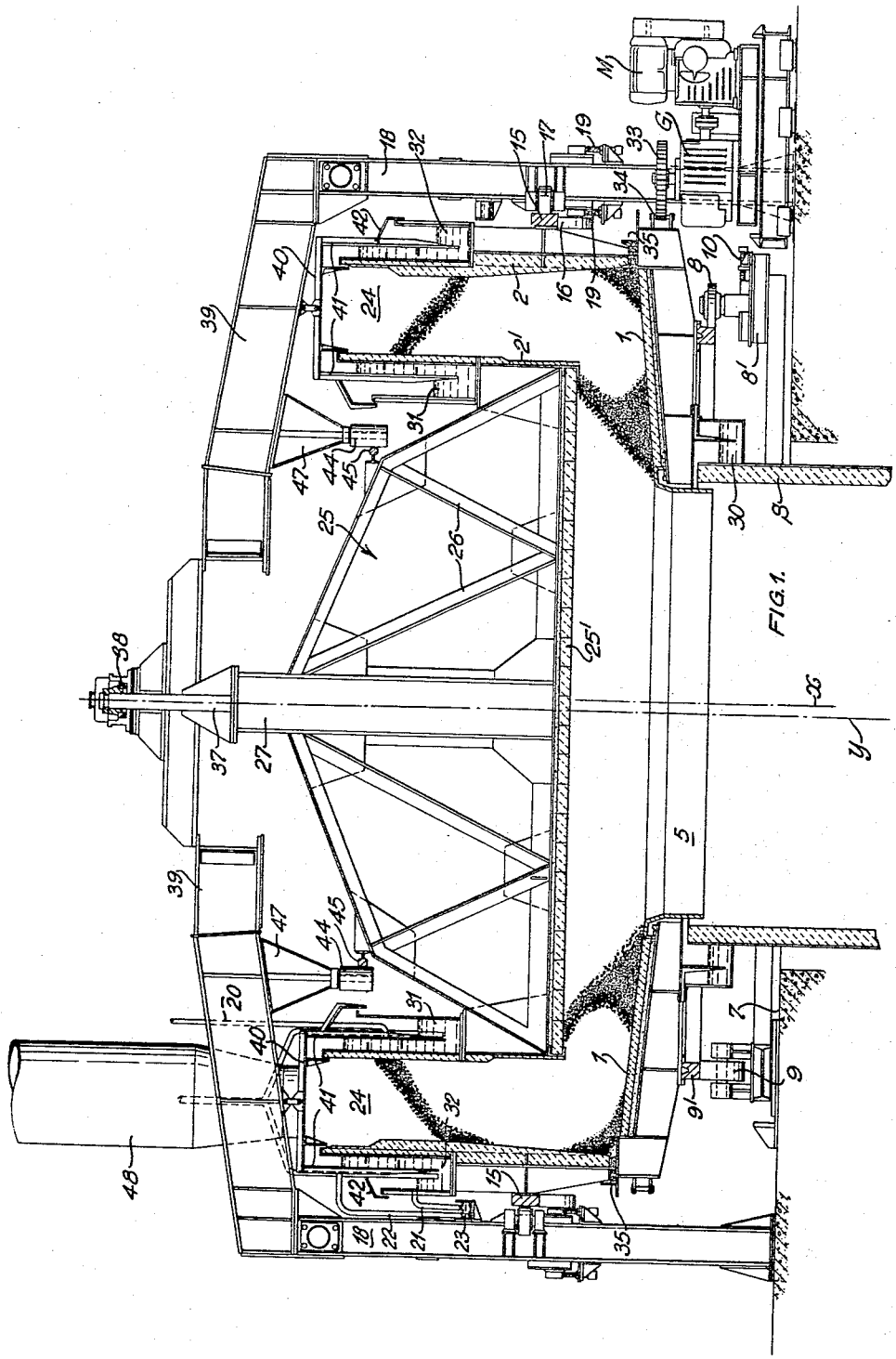

This application is a continuation-in-part of application Serial Number 375,039 filed on the June 15, 1964, now abandoned, relating to apparatus for effecting contact between solids and gases for the purpose of heating, cooling or otherwise treating the same.

The apparatus has been developed from the heat exchange apparatus described and illustrated in our prior United States patent specification No. 2,945,687 which comprises an annular chamber through which material to be heat hardened or treated is passed in a downwards direction in contraflow to heating and/or other processing gases, the chamber comprising a flat or substantially flat base part forming a hearth surmounted by an annular wall, both the base part and the wall being supported to rotate about vertical axes so that in operation as the chamber revolves, the bed of material which builds up on the hearth will be continuously discharged through a central opening, through which opening the heating gases are admitted.

The apparatus in the form described and illustrated in our prior specification comprises an annular chamber formed between an outer wall or bowl and an inner hood or dome structure into which chamber the material to be treated is fed, through a feed chute, fitted with a sealing device, provided in a stationary suction hood or roof portion, the suction hood having openings communicating with an exhaust flue or chimney.

Seals are provided between the hearth and the outer wall part or bowl, the junction of the hearth with the shaft for the inflowing gases, and between the bowl and the stationary hood or roof portion. The seals may consist of sand or water trough-type seals.

According to the present invention apparatus for effecting contact of gas with solid material comprises annular inner and outer wall parts defining an annular processing chamber; means separately mounting the inner and outer wall parts for rotation about a first vertical axis; an annular hearth forming the base of the said processing chamber and defining a central discharge opening for material to be treated in the chamber; means mounting said annular hearth for rotation about a second vertical axis offset from said first vertical axis with said hearth below said inner wall part so as to allow solid material to pass from said chamber to said central discharge opening; means for rotating each of the following elements, viz: said hearth, said inner wall part and said outer wall part at approximately the same rate whereby solid material within said chamber will be discharged from said chamber between said inner wall part and said hearth and out through said central discharge opening; a stationary cover for said chamber; sealing means between said cover and said inner wall and outer wall parts; a roof structure spanning said inner wall part and surmounting the centre of said hearth to extend over a space above said centre of said hearth, at least part of the upper surface of said roof structure being exposed to the atmosphere; and means for introducing a gas into said space above said centre of said hearth.

It will be seen that the principle by which the apparatus passes material through the processing chamber is that due to the offset between the axes of the processing chamber and the hearth, when the chamber and the hearth rotate together there is a continuous lateral displacement between the hearth and the chamber, which at any point on the circumference of the hearth amounts to a relative reciprocating movement between the hearth and the chamber at the same frequency as the rotation of the whole apparatus. This lateral movement withdraws material from the annular processing chamber and traverses it across the hearth until it passes out through the central discharge opening.

From this it will be appreciated that it is necessary for both the inner and outer wall parts defining the processing chamber and the hearth, to rotate together substantially in step with each other. As however will be further explained below it is not normally necessary for the three elements of the apparatus, that is to say the hearth, inner wall part and outer wall part to be rotated at exactly the same rate, and they may indeed be rotated at rates differing by up to plus or minus 10% or thereabout.

The main determining factor is that when the three elements are not rotated at exactly the same rate, a grinding effect is exerted on the material being treated. This may in fact in certain circumstances be desired, or in others may be of no consequence. It is therefore in practice only necessary to take steps to ensure that the elements are rotated at exactly the same rate when treating fragile or friable material which it is required should not be broken or degraded by the grinding effect which will otherwise be present.

As to the manner in which the elements of the apparatus may be rotated, this is largely a matter of choice depending upon the precise nature of the use to which the apparatus is to be put and the nature of the solid material involved.

Thus rotation of the elements may be achieved in the following ways:

(1) All three elements may be independently and positively driven by an suitable prime mover, for example an electric motor, via appropriate gearing and transmission systems.

(2) Only one element may be positively rotated and the other two elements coupled thereto.

(3) Two elements may be positively and independently rotated and the third element coupled to one of them.

The coupling between the elements referred to in 2 and 3 above may include positive mechanical coupling means, such as for example a connecting link or wire rope, connecting the two elements in such a way that the positively rotated element drags the coupled element, or alternatively the coupling may be effected solely by means of the material in the processing chamber that is to say drive may be transmitted from the positively driven element or elements by means of the frictional drag of the material.

Necessarily, in addition to a positive mechanical linkage between the elements, when provided, the elements are also linked by the frictional forces resulting from the contact therewith of the material being treated. Due to their offset axes, the hearth and the chamber behave to some extent as if they were the two parts of an internal gear pair having a low ratio of relative rotation. When therefore the elements are positive mechanically linked, the means by which the linkage is achieved must possess considerable strength to overcome the substantial forces resulting from this frictional gearing effect. The frictional gearing effect also increases the power required to drive the elements in rotation.

Consequently, it is normally preferred that the coupling between the elements should be solely by means of the frictional drag of the material. This necessarily results in a certain degree of slip occurring between the elements, but this slip for nodular materials of average or greater than average resistance to crushing and abrasion is of no great consequence. Further, in most cases it suffices to positively rotate only one element, preferably the hearth, although it would be substantially equally effective solely to rotate the outer wall part.

For high temperature applications the roof structure is lined on its undersurface with refractory material.

Due to the roof structure being exposed to the atmosphere on its external surface the advantage is obtained that it is available for direct inspection and repair and is maintained at a lower temperature, than the dome structure of the apparatus described and illustrated in specification No. 2,945,687 where the dome structure was totally enclosed. The further advantages are also obtained in that the roof structure can be supported by or formed in one with a rigid framework, and can be provided with suitable inspection ports.

Normally the heating and/or other processing gases are introduced into the space enclosed by the roof structure through the discharge opening in the hearth, but according to a further feature of the invention, the roof structure may be provided with a central opening which serves as a means of introducing the heating and/or other processing gases, or additional heating or processing gases. The opening in the roof structure may also serve as a vent opening to which a flue may be connected for use when starting up and shutting down the plant or at other times.

In accordance with another feature of the invention provision may be made to generate heat within the space enclosed by the roof structure. This heat may be generated by accommodating gas or liquid fuel burners in the space beneath the roof structure.

The gases after having passed through the bed of material on the hearth and in the annular chamber are withdrawn from the apparatus through ducts communicating with corresponding openings in the cover of the chamber.

Figure 3:
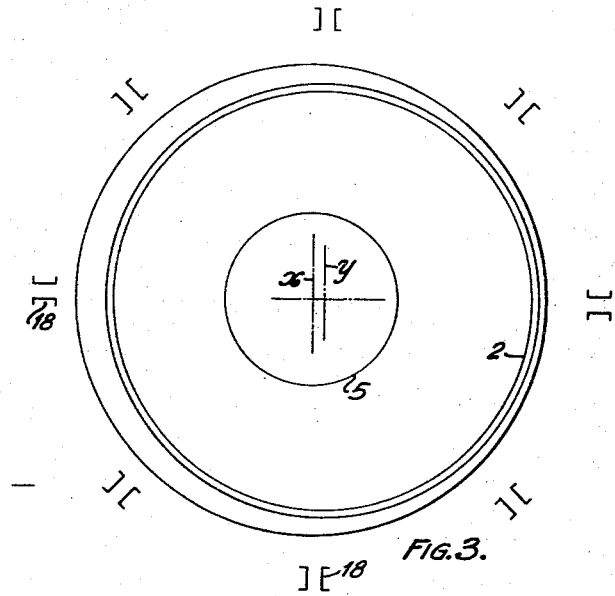
Figure 2:
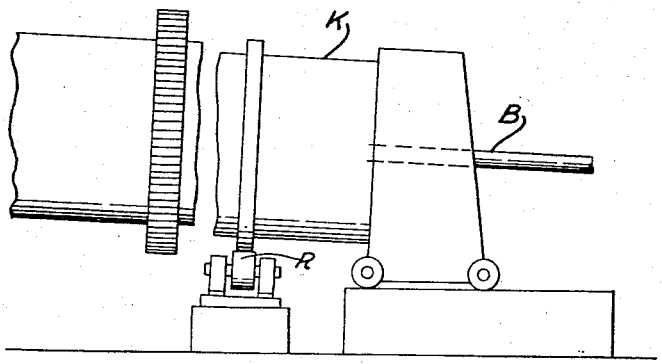
Figure 4:
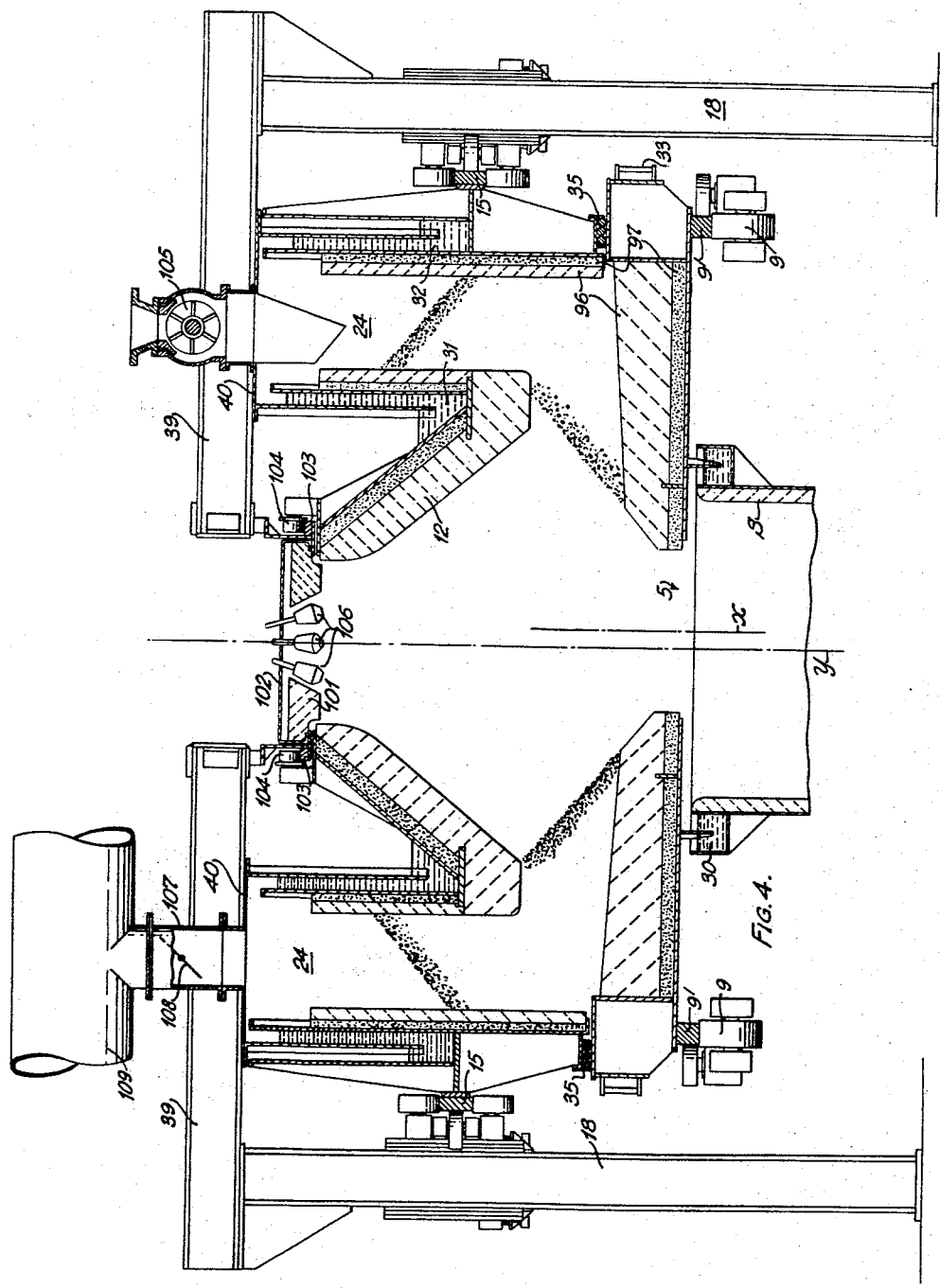
Figure 5:
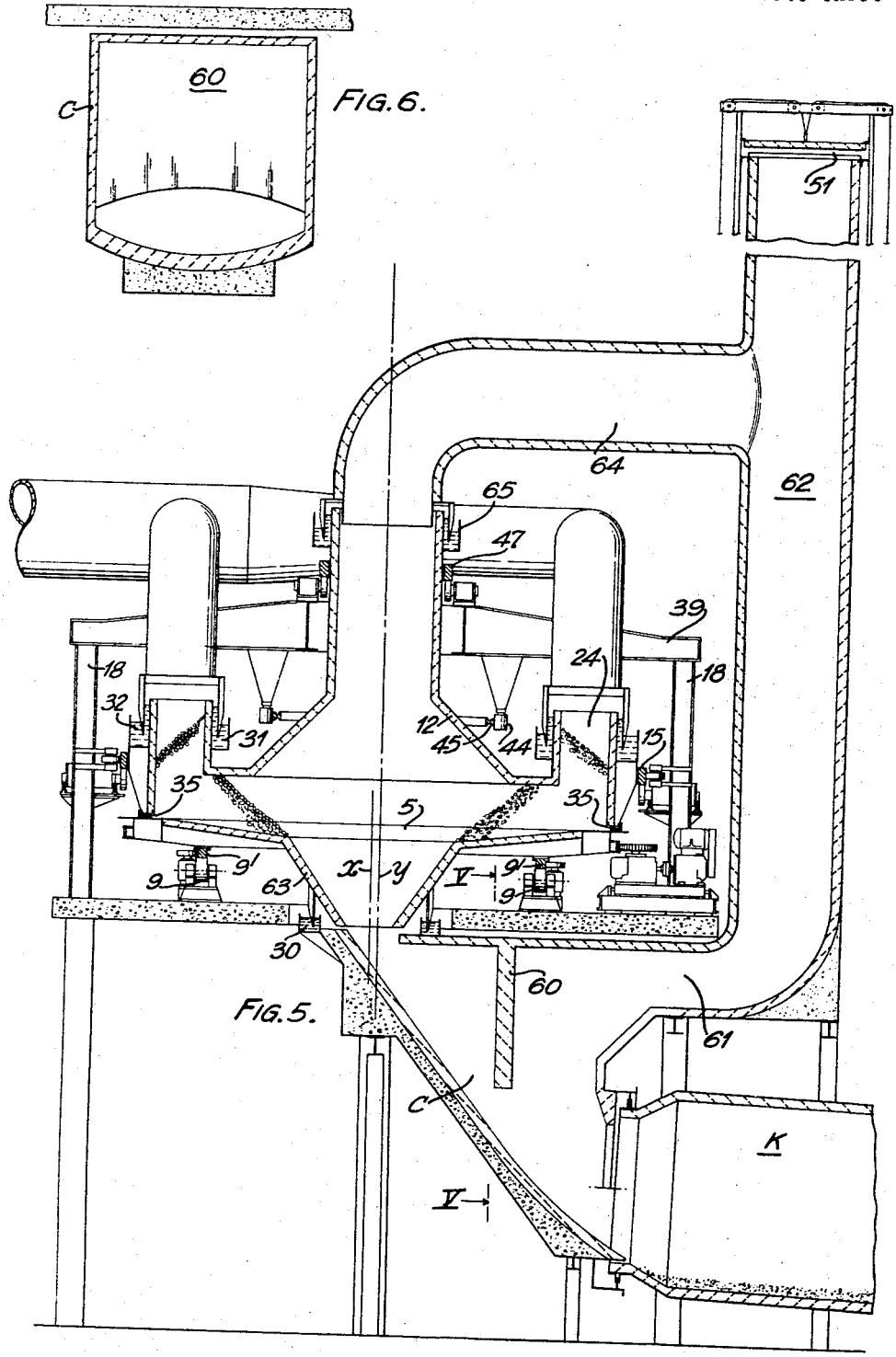
Figure 6:
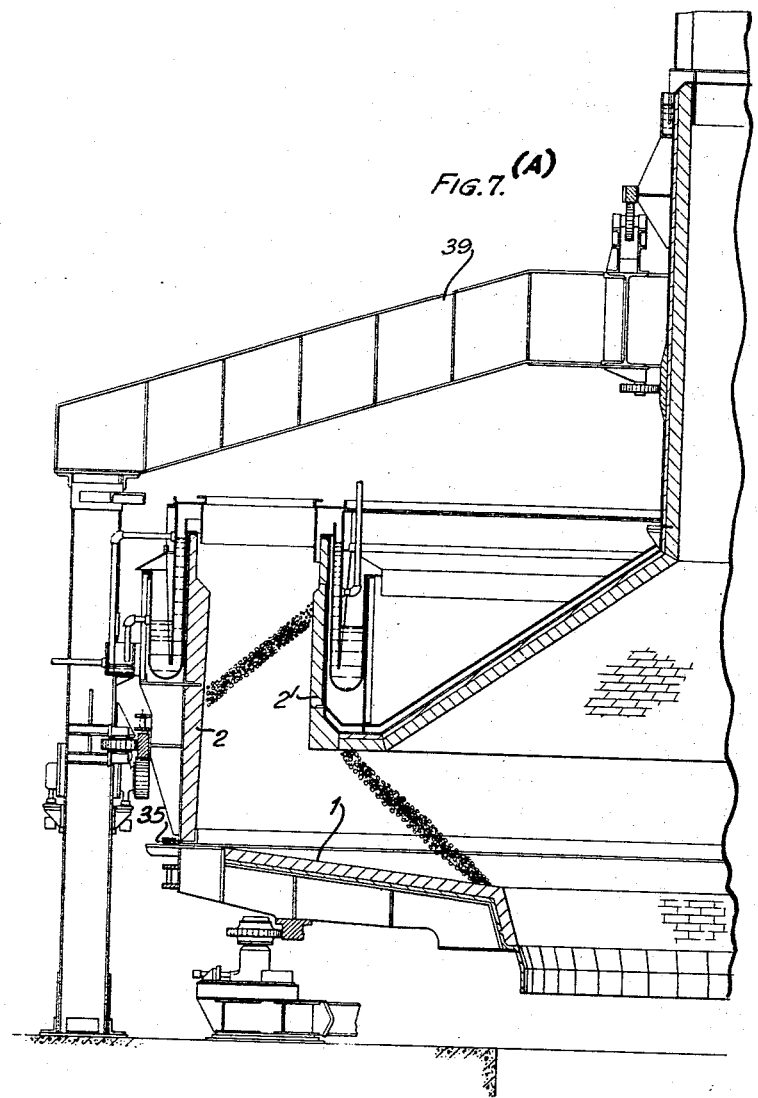
Figure 7:
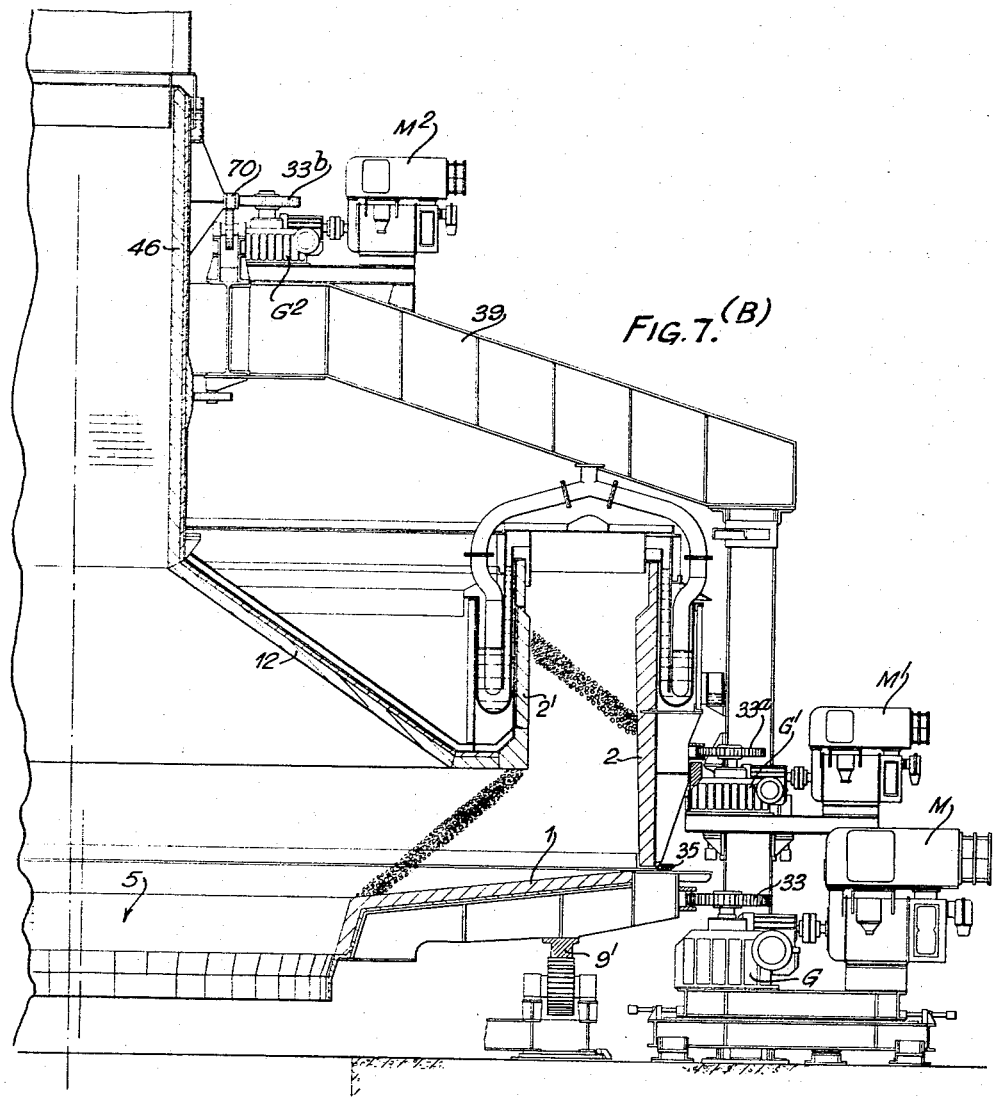
Figure 12:
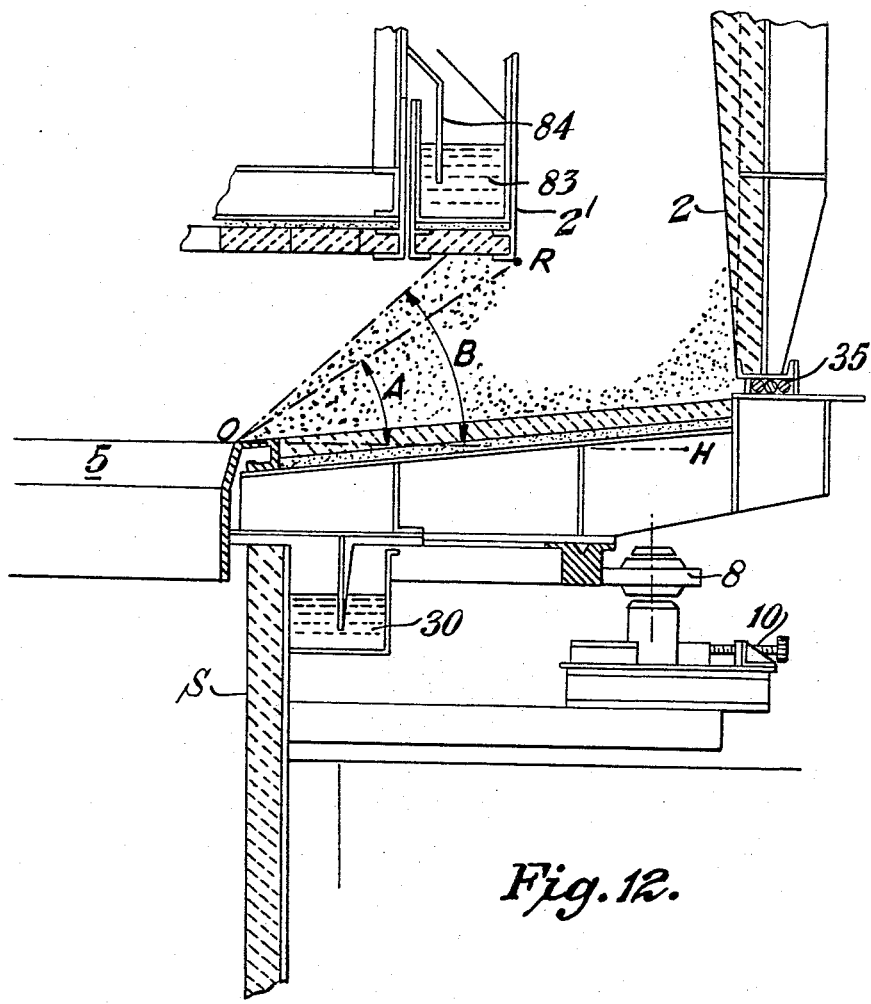

The invention is further described below with reference to the accompanying drawings, in which:

FIGURE 1 is a sectional elevation of apparatus in accordance with one embodiment of the invention, FIGURE 2(A) is a diagrammatic sectional elevation of a modified apparatus intended for use in conjunction with a cement kiln, FIGURE 2(B) illustrates the burner end of a cement kiln shown in FIG. 2(A), FIGURE 3 is a diagrammatic section on the line A—A of FIGURE 2, FIGURE 4 is a sectional elevation of another embodiment of apparatus in accordance with the invention in which provision is made for generating heat within the apparatus, FIGURE 5 is a diagrammatic sectional elevation of the apparatus similar to that of FIGURE 2 but fitted with means for by-passing the gases from the kiln, FIGURE 6 is a detailed sectional view on the line V—V of FIGURE 5, FIGURES 7(A) and 7(B) are sectional elevations of an apparatus similar to that of FIGURES 2 and 5 but showing means whereby the three elements of the apparatus may be positively driven, FIGURE 8 is a sectional elevation of apparatus in accordance with the invention in which the roof structure is static, FIGURES 9 and 10 are detailed plan and elevational views respectively of means by which the outer wall and hearth of the apparatus may be positively mechanically linked or coupled together, FIGURE 11 is a diagrammatic plan view indicating a wire rope or the like by which the outer wall part or hearth in accordance with the invention may be coupled, and FIGURE 12 is a part sectional elevation of apparatus in accordance with FIGURE 8 to explain the manner in which the spacing of the inner wall part from the hearth must be adjusted depending upon the angle of repose of material being treated.

Referring to FIGURE 1 the apparatus shown therein comprises an annular base plate 1 constituting the hearth of an annular processing chamber generally indicated at 24 which is defined by outer and inner wall parts 2 and 2' respectively. The base plate or hearth 1, the inner wall part 2' and the outer wall part 2 are separately mounted for rotation, the hearth 1 about an axis $x$ and the inner and outer wall parts about an offset axis $y$.

The chamber 24 is closed at the top by a stationary annular cover plate 40 suspended by circumferentially spaced links from a super-structure 39, which is supported by uprights 18.

The cover is arranged to close the chamber in an air tight manner by means of downwardly depending flange plates 41 which extend into liquid filled troughs 31 and 32, which are built in respectively to the wall structure of the outer and inner walls 2 and 2'. Overhanging guard plates 42 minimise loss of sealing medium by evaporation in the event of it being a liquid, and also excludes the egress of dirt and dust. Liquid, preferably water, for the sealing troughs 31 and 32 is constantly supplied by pipes, one of which is shown at 20 to maintain the troughs filled to the level of overflow pipes indicated at 21 and 22 which discharge into a drain trough 23 secured to the uprights 18 of the superstructure.

The hearth 1 is built up on a girder type frame which on its underside is provided with a circular running band or track 9', by which the hearth is rotatably supported on a plurality of rollers, one of which is indicated at 9, mounted to revolve in brackets resting on a base 7. To confine movement of the hearth 1 to rotation about the axis $x$ a plurality of circumferentially spaced thrust rollers 8 are provided to engage the lateral wall of the band 9'. The rollers 8 are laterally adjustable by means of screws 10 along radially aligned guideways 8'.

The hearth 1 is arranged to be driven by means of an electric motor M driving through suitable reduction gearing G, a pinion 33 which meshes with a toothed driving band 34 on the outer perimeter of the hearth 1.

The outer wall part 2 is provided with a tyre 15 by which it is rotatably supported on rollers 16 mounted on the uprights 18 to revolve on radially aligned horizontal axes. As shown means, incorporating screws 19 are provided to enable the rollers 16 to be vertically adjusted. Movement of the outer wall 2 is confined to rotation about the axis $y$ by lateral thrust rollers 17.

The inner wall part 2' is united with a roof structure 25 which spans the centre of the hearth to define and enclose a space thereabove. The roof structure comprises a framework 26 lined on its underside with refractory material 25', and suspended by a central tubular rod or king pin 27 which is attached to a spindle 37 suspended to revolve in a central bearing 38. The bearing 38 in turn is carried by the superstructure 39. Thrust rollers 44 mounted to revolve about vertical axes on a series of circumferentially spaced brackets 47 depending from the super-structure 39 engage a circular rail 45 fast with the framework 26 of the roof structure, to ensure that the roof structure rotates about the axis $y$ and is prevented from lateral movement.

Material to be treated, i.e. dried, heated, cooled or otherwise processed is supplied to the processing chamber 24, via one or more suitably controlled apertures, or hatches in the cover 40, to build up into a bed supported by the hearth 1 and contained between the inner and outer walls 2′ and 2. For convenience such an aperture or hatch is not illustrated in FIGURE 1 but examples are further described and illustrated in conjunction with the alternative embodiments of the invention.

In the embodiment illustrated no provision is made for positively rotatably driving either the inner wall 2′ or the outer wall 2. However when the apparatus is in use and the chamber 24 filled with material drive will be transmitted to the inner and outer wall parts by the drag of the material in contact therewith and resting on the hearth which will be driven in rotation. In this manner therefore the inner and outer wall parts will be driven in rotation at substantially the same rate as the hearth is driven.

Upon such rotation, as explained at the outset, due to the offset of the axes $x$ and $y$, the hearth and chamber rotate eccentrically with the result that material is continuously peeled off the bed on the hearth 1 and passes out through a central discharge opening 5 provided therein.

Processing gases, for example hot gases issuing from a kiln, are supplied to the apparatus via a shaft S, through the discharge opening 5, a liquid or other suitable seal being provided between the shaft S and the hearth 1 as indicated at 30. A further seal is provided between the lower end of the outer wall 2 and the hearth 1 as indicated at 35. From the space above the hearth enclosed by the roof structure 25, into which they are initially introduced, the processing gases are of course constrained to pass through the bed of material in contraflow thereto, the gases finally being withdrawn or allowed to escape from the processing chamber via one or more flues or ducts as indicated at 48.

Necessarily when reliance is placed on the frictional drag of the material to transmit drive from the hearth to the inner and outer wall parts, these will not revolve at exactly the same rate, in that some degree of slippage is bound to occur.

As to the degree of slippage which is likely to occur when only one element of the apparatus is driven, and the other elements are allowed to follow as a result of the frictional coupling provided by the material, it has been found that the slip between the positively rotated and the following elements may amount to as much as 3 or 4% or, with material of low frictional coefficient, even more. As an example, with apparatus in accordance with FIGURE 1, in which the diameter of the outer wall part was 30 feet, the axes $x$ and $y$ of the hearth and chamber were offset by 3¼ in., the hearth was driven at 0.6 r.p.m. and the material being treated therein comprised nodules of cement raw material, made from stiff filter cake prepared by the filtration of a slurry of chalk and clay, the outer wall lagged behind the hearth to the order of 1.6% and the inner wall lagged behind the hearth to the order of 0.3%. As a matter of interest this apparatus rotated at the rate given, had a throughput of approximately 50 tons per hour.

With relatively strong materials the grinding effect this degree of slip will occasion is of no real consequence. With weaker and softer materials however excessive breakdown and dusting can be caused. Such degradation of the material may detract from its value and also obstruct the flow of gas through the material in the processing chamber resulting in a higher gas pressure drop and increased operating cost. To avoid this it is necessary to rotate one or both of the wall parts by means other than the frictional drag of the material so that they may be rotated at the same rate as the hearth. Means by which this may be done are described below in relation to the alternative embodiments of the invention.

It should perhaps here be noted that with some types of material it may be desirable positively to drive the elements of the apparatus at different speeds, though still at substantially the same rate, so as to produce positively the relative speeds which result from relying on the frictional drag of the material to transmit drive between the elements.

It will be seen that by the provision of a stationary cover 40 for the processing chamber 24, independent of the main roof structure 25, the framework 26 of the latter and the upper surface of the roof proper, comprising in the present embodiment the refractory lining 25′, is open to the atmosphere. As a result the roof structure will be maintained at a lower temperature than was possible with the enclosed dome structure of the apparatus in accordance with U.S. specification No. 2,945,687. and further the roof structure is available for direct inspection and repair.

In addition to this the roof structure can be given greater rigidity and strength to permit the use of a more substantial refractory and insulating lining than in the previous apparatus, thereby enabling higher operating temperatures to be employed.

Referring now to FIGURES 2 and 3 a modified form of the apparatus of FIGURE 1 is shown in conjunction with a kiln K, this apparatus being designed to effect the preliminary treatment of cement raw materials prior to their introduction into the kiln, the hot gases issuing from which are employed as the processing gases.

As will be seen the basic arrangement of the apparatus is the same as that of FIGURE 1 and corresponding parts will accordingly not be specifically described. They have however been identified by the same reference numerals as in FIGURE 1.

It will be seen that the roof structure of the apparatus differs from that of FIGURE 1 in that it comprises a frusto conical structure 12 defining a central aperture which connects with a hollow shaft 46 united with the roof structure and by which it is suspended for rotation, a tyre 47 being secured to the shaft 46 to be engaged by a series of circumferentially arranged rollers 49 mounted in brackets, supported on the super-structure 39. At its upper end the shaft 46 is connected to a static chimney stack 54, between which and the shaft 46 a seal is provided as indicated at 55. A damper valve 51 is provided in the chimney stack 54 for a purpose to be described.

An auxiliary furnace or heat generator A is optionally provided, connected to the chimney stack 54 by a duct 56. A feed chute 57 controlled by a rotary meter 58 is indicated whereby material is supplied to the processing chamber 24, such means having for convenience been omitted from FIGURE 1. Means by which gases are withdrawn from the chamber 24 are also further illustrated and comprise a series of vertical ducts or flues one of which is indicated at 48, connected to a pipe line P leading to an extractor fan F, whereby a forced draught through the processing chamber may be achieved.

The kiln K is of a type well known in the art and will not be described in detail. Its burner is indicated at B, and the rollers by which it is supported for rotation, are indicated at R. The full extent of the shaft S which is only partly indicated in FIGURE 1, is shown by which gases from the kiln are introduced through the central discharge opening 5 in the hearth.

When starting up the apparatus the kiln K is first fired, the damper valve 51 being opened to provide a through draught. Once the kiln K is operating satisfactorily the damper valve is then closed, to constrain the gases issuing therefrom to pass into the processing chamber 24.

The purpose of the additional furnace or generator A is to produce additional processing gases when these are required, which will of course be introduced into the space beneath the roof structure via the chimney stack 54 when the damper valve is closed.

Referring now to FIGURE 4 an alternative form of apparatus in accordance with the invention is shown in which means are provided to generate heat within the apparatus itself.

Again the basic construction of the apparatus is the same as that of FIGURES 1 and 2, and will not be described in detail. The roof structure is of frusto-conical shape as in the embodiment of FIGURE 2, but in this case the central opening therein is closed by a stationary cover plate 102 which is supported on a circular channel 101 suspended from super-structure 39.

The roof structure is suspended for rotation by means of a plurality of circumferentially spaced rollers 104 mounted on brackets secured to its upper end, which run on a tyre 103 carried by the circular channel 101. A series of burners indicated at 106 are positioned beneath the roof plate 102, to generate heat within the space above the hearth 1 enclosed by the roof structure. The burners are conveniently gas or liquid fueled. The roof structure, the inner and outer wall parts and the hearth are provided with a refractory lining 96 and a heat insulating lining 97. The cover plate 102 is also lined with refractory. Similar linings may be provided for the corresponding parts of the other embodiments illustrated.

A valve device for feeding material to the processing chamber 24 is indicated at 105. Offtake for the processing or heating gases as before is by ducts one of which is shown at 107 in this case controlled by a valve plate 108, and leading to a take off pipe 109.

The cover 40 of the chamber 24 it will be noted is in this embodiment directly secured to the superstructure 39. The tyre 15 by which the outer wall part is supported is also arranged to be engaged by a second set of rollers on its upper side to prevent upward movement of the outer wall.

It will be understood that the apparatus of this embodiment is primarily intended for the heat treatment of material which it is not required subsequently or immediately to pass on to a kiln for further treatment.

Referring now to FIGURES 5 and 6 a further modified arrangement of the apparatus is shown in which it is arranged to supply heating or processing gases to the processing chamber by means of a central aperture in the roof structure rather than via the discharge opening in the hearth.

It will be appreciated that when treating fine or pulverulent materials by feeding processing gases into the chamber from a point above the hearth and not via the central discharge opening while the contraflow effect of the gases through the bed of material on the hearth is still retained, there is the advantage that the incoming gases do not pass through the outgoing material, so that the entrainment and recirculation of material by the gases is avoided.

The apparatus itself is basically identical to that of FIGURE 2 and the hot processing gases are derived from a kiln K to which the material treated in the apparatus is subsequently to be passed. A baffle 60 however is positioned within a chute C by means of which material delivered through the discharge central opening 5 in the hearth is directed into the kiln K so that the hot gases therefrom are diverted into the flared open end of a flue 61 leading to a vertical duct 62. It will be noted that the discharge opening is in this case restricted by the provision of the frusto-conical flange or skirt 63. The duct 62 is connected to the hollow shaft 46 united with the conical roof structure 12, via a further duct 64, a seal being provided between the shaft 46 and duct 64 as indicated at 65. As shown, means are provided at the upper extremity of the duct 62 for opening and closing same, for the same purpose as the valve plate 51 described in connection with FIGURE 2. That is to say the duct 62 is opened to the atmosphere when the kiln K is started up, to provide a through draught, but is thereafter closed to constrain the gases therefrom to pass via the duct 64 into the space enclosed by the roof structure and thence to the processing chamber 24.

It will have been noted that in all the embodiments so far described, means have only been provided for positively rotatably driving the hearth. As however indicated at the outset, although this arrangement is preferred, the elements may be caused to rotate in a variety of other ways. Thus, in FIGURE 7, apparatus basically corresponding to that of FIGURE 2 is shown, in which means are provided for positively rotating not only the hearth 1 but also the outer wall part 2 and the inner wall part 2'. Thus it will be seen that in addition to the provision of a motor M arranged to drive the pinion 33 via reduction gearing G to drive the hearth 1, a further motor M1 reduction gearing G1 and pinion 33a are provided to drive the outer wall part 2 in a corresponding manner. The inner wall part is positively rotated by arranging to rotate the roof structure with which it is united. For this purpose a further drive motor M2 is mounted on the super-structure 39 to drive via reduction gearing G2 a pinion 33b meshing with a circular rack 70 fast with the shaft 46.

Alternatively, drive means may be provided for only one or two parts, and the non driven element or elements positively mechanically coupled to the driven one(s). Thus in FIGURES 9 and 10 indication is given as to a manner in which the hearth and outer wall part of an apparatus may be linked together. As shown therein a pin 90 is secured to a bracket 91 fast with the bottom of the outer wall part and arranged to engage in a slot 92, formed in a flange plate secured to a point on the periphery of the hearth. This arrangement is of course necessary to accommodate the relative lateral movement which occurs between the hearth and outer wall part.

An alternative manner in which the hearth and outer wall of an apparatus may be positively coupled together is indicated in FIGURE 11. As shown therein the mechanical coupling simply comprises a wire rope 93, anchored at one end as indicated at 94, to a point on the periphery of the hearth and at its other end to a point indicated at 95 on the circumference of the outer wall part.

While it is normally preferred that the inner wall part should be united with the roof structure, and the latter arranged for rotation to bring about rotation of the inner wall part, this is not essential. Accordingly the apparatus may be modified in this respect, as indicated in FIGURE 8. As will be seen therefrom a static roof structure 80 is provided carrying on its upper surface around the periphery thereof a series of rollers 81 arranged rotatably to support a tyre 82 carried by brackets projecting inwardly from the upper end of the inner wall part. To provide a seal between the roof structure and the inner wall part the latter at its lower end is formed with a trough 83, into which a depending flange 84 secured to the peripheral wall of the roof structure is arranged to extend.

While it has not so far been mentioned, it will be appreciated that the lower end of the inner wall part must be so positioned above the surface of the hearth and in relation to the discharge opening therein that the angle to the horizontal of a line extending from a point on the lower end of the inner wall part to the nearest point on the periphery of the discharge opening, is less than the angle of repose of the material being treated.

Referring to FIGURE 12 which duplicates a part of the apparatus of FIGURE 8, as indicated thereon it is necessary that the angle HOR, that is to say the angle to the horizontal of a line drawn from the periphery of the discharge opening to the outer bottom edge of the inner wall part, and further identified on the drawing by the arrow A, must be less than the natural angle of repose of the material being treated which is indicated by the angle HOM, and further designated by the arrow B. It will be immediately apparent that if the angle A was greater than the angle B then material supplied to the processing chamber would pour straight out of the discharge opening and thus, of course, negate the desired action of the apparatus, which is to control the manner in which the material is discharged therefrom.

Normally apparatus in accordance with the invention will be designed for a particular purpose involving a specific material or materials, the angle of repose of which is known, and the apparatus is designed accordingly. Should however it be desired to provide an apparatus to handle materials having different angles of repose then it is necessary to make provision for the adjustment of the spacing of the inner wall part from the surface of the hearth. This may be done in a number of ways, for example shims may be inserted under the pedestals of the supporting rollers or bearings of the roof structure, in fact such shims are indicated in FIGURE 1 under the central roof suspension bearing. Alternatively, as indicated in FIGURE 8, more positive means may be provided to permit the desired adjustment.

It will be noted that the roof structure 80 includes vertical members 85, of which two only are shown in FIGURE 8, provided at their upper ends with flanges 86 which are secured to the superstructure 39 by means of bolts, not shown, one or more shims, as indicated at 87, being interposed between the flanges 86 and the superstructure. In order to adjust the height of the roof structure it is first arranged that the weight thereof should be taken by a centrally disposed hydraulic or screw jack 88, to enable the bolts, by means of which the vertical members 85 are secured to the superstructure to be undone. The jack 88 is then appropriately operated bodily to raise or lower the roof structure. In the case of the roof structure being raised, it will of course be necessary to remove one or more of the shims before operation of the jack. Once the roof structure has been positioned as desired by this operation, and after, in the case of the roof structure being lowered, the interposition of further shims between flanges 86 and superstructure 39, the bolts previously removed are replaced.

While the invention has been described and illustrated in relation to heat treatment of materials e.g. the preliminary treatment of the raw materials used in the manufacture of cement, it can also be applied to heat treatment of ores and other materials. The apparatus can also be used to great advantage in other processes which involve the cooling as opposed to the heating of materials.

A typical application is in the manufacture of smokeless fuel briquettes, where the major difficulty has been to find a satisfactory means of cooling the briquettes after discharge from the devolatilising and briquetting plant, which cooling must of course take place in an oxygen free atmosphere to avoid combustion of the briquettes. It is a simple matter to arrange for the hot briquettes to be delivered to the processing chamber 24 and for a supply of cool inert or oxygen free gas to be fed to the hearth whence it will pass through the bed of briquettes thereon.

It will be understood that to ensure the most beneficial rate of cooling as well as adequate cooling of the briquettes, the speed of rotation of the hearth and chamber may be adjusted so that the briquettes are retained within the chamber for the necessary length of time.

The apparatus of the invention may also be used in chemical processes, and in the cleaning or other treatment of gases with solid material in nodular, pebble or other particulate form, or indeed in any circumstances in which contact is desired to be effected between solids and gases, the former being supplied to the treatment chamber of the apparatus, through which the gas is then passed in contraflow.

Particular examples are the heat hardening of pellets formed from iron ore concentrates and also the heat hardening and partial reduction of pellets containing a mixture of iron ore concentrates and finely ground coke or coal, the latter giving a carbon bearing nodule for final reduction in a smelting furnace.

Other applications which are envisaged include
 (i) Lime burning, including the calcination of lime-bearing pellets and/or normal crushed lime-stone.
 (ii) The production of light weight aggregates e.g. the heat hardening and bloating of nodules formed from clay or shale or other suitable mineral or from boiler fly ash, flue dust, and other waste products.
 (iii) The drying of coal, including pelletised fines.

What is claimed is:

1. Apparatus for effecting contact of gas with solid material comprising annular inner and outer wall parts defining an annular processing chamber; means separately mounting the inner and outer wall parts for rotation about a first vertical axis; an annular hearth forming the base of the said processing chamber and defining a central discharge opening for material to be treated in the chamber; means mounting said annular hearth for rotation about a second vertical axis offset from said first vertical axis with said hearth below said inner wall part so as to allow solid material to pass from said chamber to said central discharge opening; means for rotating each of the following elements, viz: said hearth, said inner wall part and said outer wall part at approximately the same rate whereby solid material within said chamber will be discharged from said chamber between said inner wall part and said hearth and out through said central discharge opening; a stationary cover for said chamber; sealing means between said cover and said inner wall and outer wall parts; a roof structure spanning said inner wall part and surmounting the centre of said hearth to extend over a space above said centre of said hearth, at least part of the upper surface of said roof structure being exposed to the atmosphere; and means for introducing a gas into said space above said centre of said hearth.

2. Apparatus as defined in claim 1 in which the means for rotating said elements include means for positively rotatably driving at least one of said elements and mechanical coupling means for transmitting drive from said positively driven element to said other elements.

3. Apparatus as defined in claim 2 wherein said mechanical coupling means includes the solid material within said chamber and in frictional engagement with said hearth and inner and outer wall parts.

4. Apparatus as defined in claim 1 in which the means for rotating said elements include means for positively rotatably driving said hearth and at least one of said inner wall part and said outer wall part.

5. Apparatus as defined in claim 1 in which said roof structure is united to said inner wall part and is rotatable therewith.

6. Apparatus as defined in claim 1 in which the means for rotating the said elements include means for positively rotatably driving said hearth.

7. Apparatus as defined in claim 1 wherein said means for introducing a gas is a means other than the material discharge opening.

8. Apparatus as defined in claim 1 including means for introducing treatment gas through said hearth central discharge opening into said processing chamber.

9. Apparatus as defined in claim 1 including a superstructure, said roof structure being suspended from said superstructure and mounted thereby for rotation.

10. Apparatus as defined in claim 1 in which said roof structure has a central aperture, said apparatus further including a flue communicating with said central aperture.

11. Apparatus as defined in claim 10 in which means are provided for opening and closing said flue.

12. Apparatus as defined in claim 10 including means for introducing treatment gas into said flue to pass into the space under said roof structure and above said centre of said hearth.

13. Apparatus as defined in claim 1 in which said roof structure has a central aperture, said apparatus further including a hollow shaft connected to and extending upwardly from said roof structure and communicating with said central aperture; means suspending said hollow shaft and thereby said roof structure for rotation; and a flue communicating with said hollow shaft.

14. Apparatus as defined in claim 10 in which said roof structure is of conical formation, said central aperture being at the apex thereof.

15. Apparatus as defined in claim 1 in which said roof structure has a central aperture, said apparatus further including a flue communicating with said central aperture; a kiln; a chute connecting said kiln to said hearth central discharge opening; a by-pass connecting said chute to said flue; and a baffle in said chute for diverting gas issuing from said kiln to flow through said by-pass to said flue.

16. Apparatus as defined in claim 1 including means for generating heat within the space under said roof structure and above said hearth.

17. Apparatus as defined in claim 16 in which said roof structure is of frusto-conical formation, closed at its top, and in which said means for generating heat comprises fluid fuel burners mounted beneath the closed top of said roof structure.

18. Apparatus as defined in claim 1 in which said sealing means between said cover and said inner and outer wall parts comprises troughs mounted respectively on said wall parts for containing sealing medium, and flange plates mounted on said cover and extending respectively into said troughs.

19. Apparatus as defined in claim 18 in which each flange plate is provided with a guard plate overhanging the associated trough.

20. Apparatus as defined in claim 1 for the manufacture of cement or the like, in combination with a kiln; and means for delivering material discharged from said hearth central discharge opening to said kiln and for supplying heated gas from said kiln to the space between said roof structure and said centre of said hearth.

21. Apparatus for effecting contact of gas with solid material comprising annular inner and outer wall parts defining an annular processing chamber; means separately mounting the inner and outer wall parts for rotation about a vertical axis; an annular hearth forming the base of the said processing chamber and defining a central discharge opening for material to be treated in the chamber; means mounting said annular hearth for rotation about a second vertical axis offset from said first vertical axis with said hearth below said inner wall part so as to allow solid material to pass from said chamber to said central discharge opening; means for positively rotatably driving said hearth; the solid material within said chamber being in frictional engagement with said hearth and said inner and outer wall parts so that said wall parts are rotated at approximately the same rate as said hearth whereby solid material within said chamber will be discharged from said chamber between said inner wall part and said hearth and out through said central discharge opening; a stationary cover for said chamber; sealing means between said cover and said inner wall and outer wall parts; a rotatably mounted roof structure spanning and united to said inner wall part and surmounting the centre of said hearth to extend over a space above said centre of said hearth, at least a part of the upper surface of said roof structure being exposed to the atmosphere; and means for introducing a gas into said space above said centre of said hearth.

22. Apparatus as defined in claim 21 in which said roof structure has a central aperture, said apparatus further including a flue communicating with said central aperture.

23. Apparatus as defined in claim 22 in which means are provided for opening and closing said flue.

References Cited

UNITED STATES PATENTS

| | | | |
|---|---|---|---|
| 2,190,234 | 2/1940 | Hasselbach et al. | 263—32 |
| 2,799,489 | 7/1957 | Rusche | 263—32 |
| 2,863,654 | 12/1958 | Beal et al. | 263—32 |
| 2,945,687 | 7/1960 | Davis | 263—32 |

FREDERICK L. MATTESON, JR., *Primary Examiner.*

D. A. TAMBURRO, *Assistant Examiner.*